Figure 1:
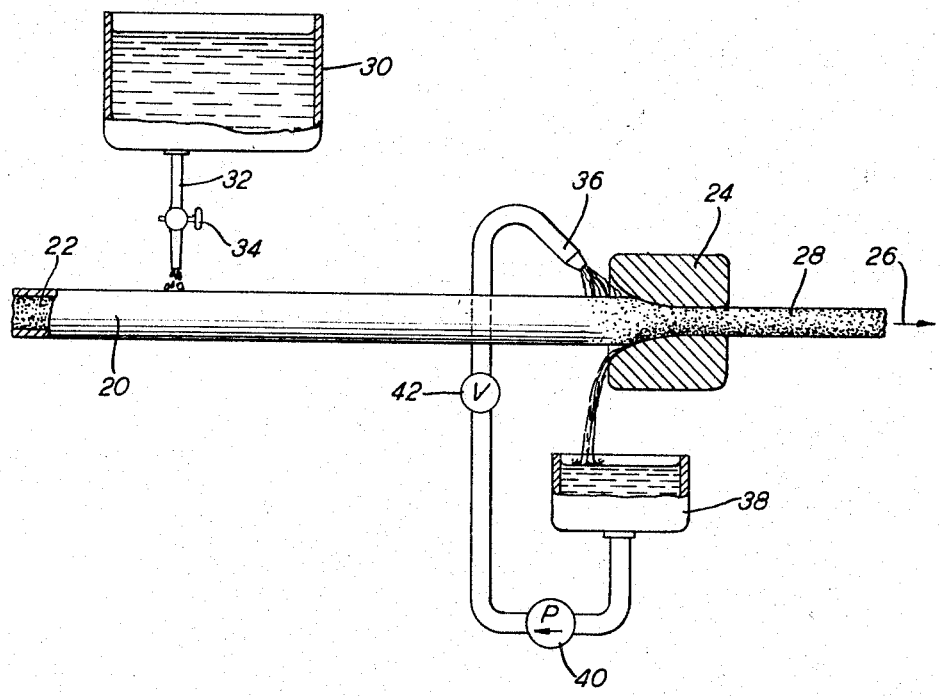

INVENTOR
JOHN E. BALL
BY
Edmund W Bopp
AGENT

United States Patent Office 3,321,944
Patented May 30, 1967

3,321,944
SURFACE FINISH FOR CONTINUOUS ELECTRODE
John E. Ball, Baltimore, Md., assignor to Air Reduction Company, Incorporated, New York, N.Y., a corporation of New York
Filed Dec. 31, 1964, Ser. No. 422,767
5 Claims. (Cl. 72—46)

This invention relates to arc welding electrodes and their manufacture and more particularly to electrodes for use in gas metal-arc welding.

Consumable electrode gas shielded arc welding such for example, as disclosed and claimed in Muller et al. United States Patent No. 2,504,868 and in Gibson and Lyons United States Patent No. 2,907,865, has virtually revolutionized the welding industry by providing means for making fast, efficient high quality welds on a variety of materials and under a variety of conditions. There are a number of variations of the basic gas shielded consumable electrode process that have been introduced which are particularly applicable to specific welding requirements such as the use of flux core tubular wires and the use of various welding conditions and various shielding gas mixtures. In all variations of the process however, a long length of relatively small diameter wire (usually in the range of from 0.094 to 0.030 inch) is fed to the welding gun or head from a spool or coil by appropriate wire feed means such as power driven pinch rolls. At a position close to the point of welding, the wire passes in electrical contact with a feed means such as a contact tube or brush where the current is fed to the wire to maintain the welding arc between the end of the wire and the work. In most manual apparatus and in some machine apparatus the wire supply coil is a considerable distance from the welding head and the wire is pushed or pulled through a conduit or casing from the point of supply to the welding head. In the case of manual apparatus this casing is flexible and normally contains loops and bends which vary as the operator moves about with the welding gun. As a result considerable frictional resistance is developed to the feeding of the bare wire through such casing from the wire supply source to and through the welding head. This frequently results in erratic or interrupted wire feed causing variations in the quality of the weld and at times causing the arc to burn the wire back into the apparatus damaging the apparatus. It has long been recognized that this difficulty could be alleviated, at least in part, by the provision of a lubricant on the surface of the wire to allow it to pass more easily through the conduit and the welding gun and thus improve the reliability and uniformity of feed.

This solution to the problem however is defeated by the overriding consideration that in consumable electrode gas shielded arc welding the surface of the electrode must be free from all foreign matter that might adversely affect the weld quality or arc characteristics or that might interfere with the reliable and uniform pick-up of current as the wire passes in contact with the current pick-up shoe or tube. In general, bare consumable electrode wires of the type here under consideration should be virtually hygenically clean for optimum welding performance.

Electrode wires of the type here under consideration are invariably reduced to final diameter by drawing through a die or reducing rolls in one or several steps to produce a finished wire product of substantially smaller diameter than the original stock from which it is made. In order to produce such wire without danger of rupturing the filament and to produce such wire with a smooth bright surface finish, it is necessary to apply a lubricant in the reducing operation. Conventionally such wire drawing lubricants are hydrocarbons such as soaps and greases which are intolerable if carried into the welding process. It has therefore been the practice in the past to chemically or electrolytically clean the surface of the wire subsequent to the drawing operation and prior to the use of the wire in the welding process. Such cleaning operations are expensive and time-consuming and often ineffective because the lubricants are embedded in the pores of the wire surface as a result of the heat and pressure developed on the surface during the drawing operation.

In the case of flux filled tubular electrodes which are used in substantially the same manner as the solid wire electrodes thus far discussed, all of the same problems exist plus certain additional problems that are peculiar to the tubular type. Such electrodes are usually made by forming a flat strip of metal into a U shape. The open trough thus formed is filled with a metered granular flux material and the strip then passed through additional forming rolls or dies to close the top of the trough to form flux filled tubes analagous in configuration to a cigarette. In order to tightly close the longitudinal seam on the metal sheath, to compact the flux core, and to reduce the product to the desired small diameter required for the welding process this flux filled fabricated tube is drawn through wire drawing dies or rolls. Since this fabricated tubular product is obviously more fragile than the solid wire, lubrication of the die and the amount that the diameter can be reduced in a single pass is much more critical than in the case of a solid wire. It must be lubricated and the lubricant must be completely removed before welding. In the case of the tubular wire this is particularly difficult because the lubricant employed invariably is forced into the longitudinal seam of the tube from which it is virtually impossible to remove it.

Still another problem encountered prior to the present invention is one of shelf-life of electrode wires properly processed and prepared for gas shielded consumable electrode arc welding. A prerequisite from the welding process point-of-view is that the surface of the wire should be free from foreign matter, capable of uniform and reliable feeding and capable of uniform and reliable pick-up at the current contact point. While the wire at the time of its manufacture, may have been carefully prepared to provide all of these requirements it is frequently subject to oxidation and the accumulation of dirt and moisture during shipment and storage which may involve a long period of time and a variety of extreme atmospheric conditions. For this reason it is the practice to plate the surface of steel wires and the like, for example, with copper and/or to package the wires with special packaging materials and/or in hermetically sealed packages which often contain a desiccant.

It is therefore an object of the present invention to overcome the aforesaid problems.

More specifically it is an object of the present invention to provide a novel electrode for gas shielded consumable electrode arc welding that has improved feeding characteristics without sacrificing welding characteristics.

It is a further object of the present invention to provide a novel electrode of the class heretofore specified having improved shelf life and requiring a minimum of precautionary measures to assure high quality welding performance.

Another object of the present invention is to provide an improved tubular electrode having improved shelf life and improved feeding and welding characteristics.

Still another object of the present invention is the provision of improved methods for the manufacture of consumable electrodes having conductive surfaces and more particularly to the manufacture of flux filled tubular electrodes.

These and other objects and advantages of the invention will be pointed out or will become apparent from the following detailed description and the accompanying drawing.

It is to be understood that the terms "electrode" and "wire" as used herein includes solid wires of circular or other cross-sectional shape as well as tubular electrodes and electrodes of other analogous shapes including tubular electrodes having a cavity filled with "flux" i.e., any adjuvant material added to the welding process as a core or inclusion in the electrode.

To avoid the disadvantages of prior art methods of size reducing welding electrodes and wires, I use a fluid dispersion of a fluorocarbon polymeric resin as a lubricant in size reduction of both solid and cored forms of electrode. I apply the fluid to the wire either at the size reduction station or just prior to reaching the same. For example, drops of the fluid may be applied to the wire at the die or the fluid may be applied by spraying or dipping just prior to entering the die.

At the usual temperature and under the pressure of the drawing die, only a very thin continuous film of the resin is left upon the wire as it leaves the size reducing process. The film is not sufficiently thick to interpose a significant amount of electrical resistance between the wire and the welding current contact member in the usual type of welding gun. The procedure may be used with various electrode metals, including iron, nickel, mild steel, copper and stainless steel.

The advantages in using a fluorocarbon polymer as the drawing lubricant include the following. Fluorocarbon polymers are known in the welding art as metallurgic scavengers and as such they serve to improve the quality of the metal deposited in the weld. The presence of a coating of the polymer on the finished welding wire is not found to be objectionable, so that no cleaning of the wire is required before use. The layer of polymer provides a chemically inert surface which keeps the wire clean and dry and protects it from rust and corrosion in storage. The polymer serves also to lubricate the wire as it is fed through elongated conduits from a supply reel to a welding arc. The polymer also acts to seal the seam in a cored wire and is harmless, or beneficial, if any of the resin penetrates the core or is retained in the core material. Furthermore, the polymer becomes decomposed in the welding process so that it does not enter or produce any porosity in the finished weld. In addition, the polymer on the wire during the drawing process as well as in the wire feed mechanism of the welding gun provides an advantageously low coefficient of friction, which makes the polymer an excellent lubricant in both of these situations.

In the case of steel wire which ordinarily is copper plated to prevent rust and corrosion, the resin coating makes copper plating unnecessary. In the sealing cored wire against entrance of undesired substances the core material is also protected against hygroscopic effects in the core which tend to entrap moisture and release hydrogen into the weld metal to cause porosity.

A specific advantage of the use of the fluorocarbon resin as a scavenging agent is that the resin in decomposing under the heat of the welding operation releases fluorine or fluorine containing vapors which are particularly active in taking up hydrogen from the vicinity of the weld. The fluorine is generated in gaseous phase and constitutes a desirable component of shielding gas supplementing whatever other shielding gases may be generated by the core material or may be otherwise provided.

The use of fluorocarbon polymers in accordance with the invention is not limited to any particular metal for the rod, wire or sheath.

Figure 2:
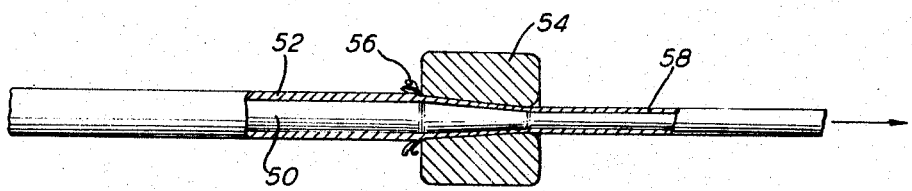

In the drawings,

FIG. 1 is an elevational view, partly in section and partly schematic, of apparatus for practicing the invention, according to one embodiment thereof; and FIG. 2 is a longitudinal sectional view of a coated rod or wire in the process of being reduced in size according to another embodiment of the invention.

Referring to FIG. 1, there is shown schematically a metal shell 20 containing a filling 22 of core material, the combination being in the process of being pulled through a die 24 in the direction indicated by an arrow 26 to seal the seam and reduce the diameter of the shell, forming a cored wire electrode 28 in the region to the right of the die 24. It will be understood that the process of forming the cored wire may involve passing the shell and filling through not one but a succession of dies, of decreasing diameters of opening so that the seam may be closed in one die, tightened in another, and the outside diameter of the cored wire may be reduced to a desired size in one or more additional dies as desired. Similarly, successive rolling operations may be employed.

A fluorocarbon polymer to serve as a lubricant is applied to the shell 20 as a steady stream, preferably in the form of an aqueous dispersion, playing upon the shell 20 at the entrance to the die 24 from a spout 36, the surplus lubricant draining into a drip pan 38 and being recirculated to the spout 36 by means of a pump 40. The rate of application of the lubricant may be regulated by means of a valve 42 or shut off entirely when not in use. The stream of lubricant is preferably made sufficiently strong to flush any residue from the mouth of the die.

Alternatively, lubricant may be applied to the shell 20 from a supply of the aqueous dispersion stored in a tank 30 and fed by gravity through a tube 32 to drip upon the shell 20 as the wire approaches the die 24. The rate of application of the drops to the wire can be controlled by means of a pinch-cock 34 or the drops can be shut off entirely when not wanted.

It will be understood that either the gravity tube 32 or the pump 40 and recirculating system may be provided singly, or that other suitable means may be used to apply lubricant to the shell 20. An important feature of this invention is that as the electrode wire, wet with the emulsion, is drawn through the die 24, the heat and pressure of the dies instantly dry the emulsion forming a tightly adhering thin polymer film on the outer surface of the wire 28 as indicated schematically by stippling of the surface of the wire 28 in the figure. For clarity in the drawing, means for pulling the wire through the die are omitted. Such means are familiar to those skilled in the art of wire drawing.

By applying the polymer to the electrode as an aqueous dispersion or emulsion, it is possible to attain a very thin coat, for example even a single molecular film or a film having a thickness of only a few molecules, and so it is readily feasible to use films of less than 0.0001 inch in thickness, which is within the range in which the fluorocarbon polymers exhibit exceptionally low coefficients of friction.

FIG. 2 shows in longitudinal section a wire 50 to which a coating 52 of an aqueous fluorocarbon polymer resin emulsion has been applied by dipping, spraying or the like and which is to be reduced in size by being passed through a die 54. Some of the emulsion is stripped from the wire 50 as the wire enters the die 54 as indicated schematically at 56. As the wire emerges from the die a thin, dry and tightly adhering layer 58 of resin remains on the wire. For the sake of clarity in the drawing, the relative thickness of coatings shown are considerably in excess of the actual relative range of thickness.

A suitable fluorocarbon polymer resin compound for use in practicing the invention is polytetrafluoroethylene, preferably in an aqueous dispersion or emulsion. A range of emulsion containing up to 70 percent of the fluorocarbon polymer can be used. Above about 70 percent the polymer tends to precipitate out of the emulsion.

Suitable fluorocarbon polymer emulsions are obtainable from E. I. du Pont de Nemours and Co., Wilmington, Del., under the trade name "Teflon" TFE—fluorocarbon resins, aqueous dispersions. Particularly good results have been obtained with the dispersion identified by Du Pont as "Teflon" 30.

When applied in the manner described herein, an extremely thin coating of the polymer remains on the surface of the finished electrode as a firmly adhering coating for protection from rust and corrosion and hygroscopic action as well as for lubrication in a subsequent electrode advancing operation. Only when the coating is applied in this manner is the coating suitable for use in a continuous welding process in which the welding current is fed to the electrode from an external contact element.

Welding rods and wires produced in accordance with the invention have been tested for shelf life and found to give better rust protection and to have a longer shelf life than prior art products.

It has been found in practice that the presence of fluorocarbon polymer on the welding rod or wire or within the core of a cored wire not only is not detrimental but is advantageous, whereas it is not possible to tolerate even very minute amounts of stearates, soaps or greases.

It is found furthermore that the low coefficients of friction exhibited by the fluorocarbon polymers hold over a much wider temperature range than is found for stearates, soaps and greases.

While illustrative forms of apparatus and methods in accordance with the invention have been described and shown herein, it will be understood that numerous changes may be made without departing from the general principles and scope of the invention.

I claim:

1. The method of making a fluorocarbon polymer resin coated welding wire for use in a continuous electric arc welding process, which method comprises the steps of applying the resin dispersed in a liquid as a surface coating upon a wire that is to be reduced in size, and drawing the said wire through a wire drawing die wherein the wire is reduced in size and the pressure and heat are such as to dry and bond a relatively thin residual coating of the resin to the surface of the wire in the size-reduced state thereof.

2. The method of making a polytetrafluoroethylene resin coated welding wire for use in a continuous electric arc welding process, which method comprises the steps of applying an aqueous dispersion of the resin to the surface of the wire, passing the said wire so coated through a wire drawing die under such pressure and heat as to dry and bond a relatively thin coating of the resin to the surface of the wire while reducing the diameter of the wire to a desired size.

3. In a process for making a continuous arc welding electrode comprising a core and a surrounding metal sheath having a longitudinal seam the improvement which comprises coating the outer surface of said sheath and sealing said longitudinal seam with polytetrafluoroethylene from an aqueous emulsion dried and bonded by the heat and pressure of drawing through a size reducing die.

4. The method of making a fluorocarbon polymer resin coated electrode for use in a continuous electric arc welding process wherein the welding current is transferred to the electrode through a contact tube, which method comprises the steps of applying the resin dispersed in a liquid as a surface coating upon a wire that is to be reduced in size, and drawing said wire, while still coated with the resin containing liquid, through a wire drawing die wherein the wire is reduced in size and the pressure and heat of the drawing operation cause a dry, thin, residual coating of the resin to be bonded to the surface of the wire in the size-reduced state thereof.

5. The method of making a polytetrafluoroethylene resin coated electrode for use in a continuous electric arc welding process wherein the welding current is transferred to the electrode through a contact tube, which method comprises the steps of applying an aqueous dispersion of the resin to the surface of a wire that is to be reduced in size, and drawing said wire, while still coated with the aqueous dispersion, through a wire drawing die wherein the wire is reduced in size and the pressure and heat of the drawing operation cause a dry, thin, residual coating of the resin to be bonded to the surface of the wire in the size-reduced state thereof.

References Cited

UNITED STATES PATENTS 1,960,194  5/1934  McHenry _____ 72—46
2,223,037  11/1940  Ihrig _____ 72—274

WILLIAM W. DYER, JR., *Primary Examiner.*

G. A. DOST, *Assistant Examiner.*